H. COULLERY.
MEASURING INSTRUMENT.
APPLICATION FILED AUG. 17, 1909.
1,053,281.
Patented Feb. 18, 1913.
3 SHEETS—SHEET 2.
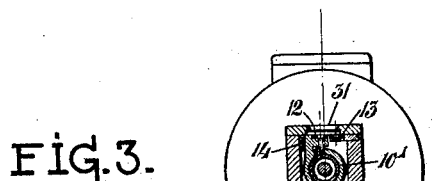
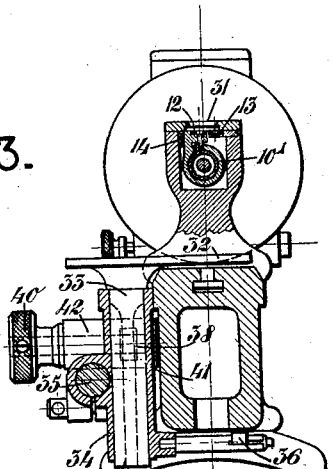
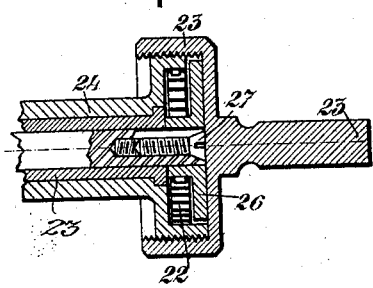
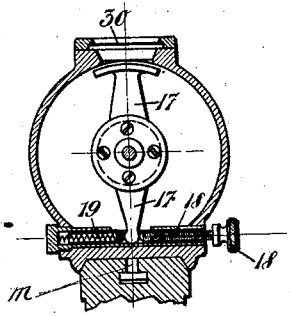
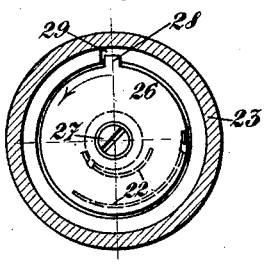
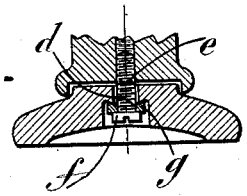
WITNESSES:
INVENTOR:
HENRI COULLERY,
by
Attorney.

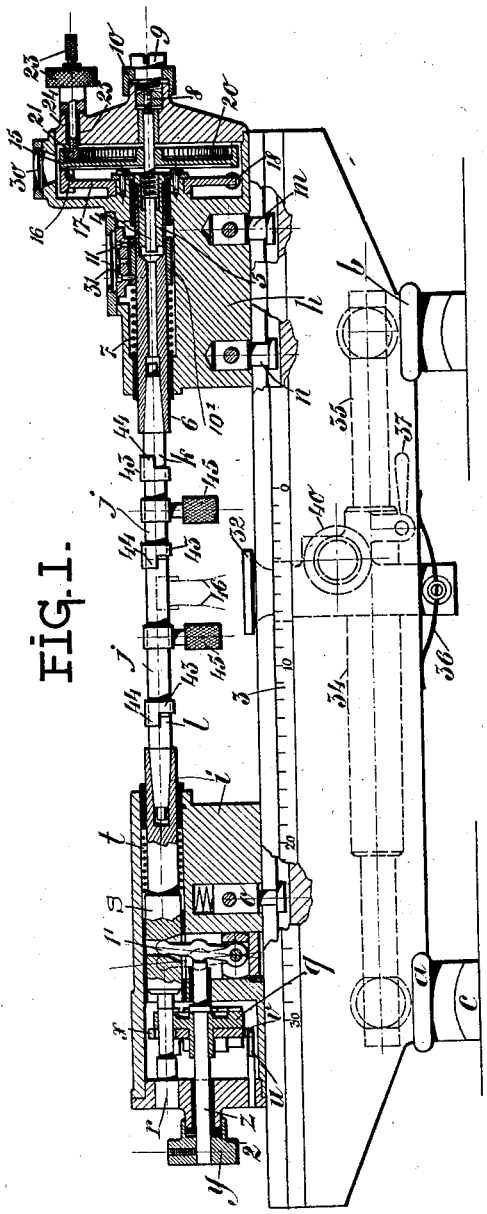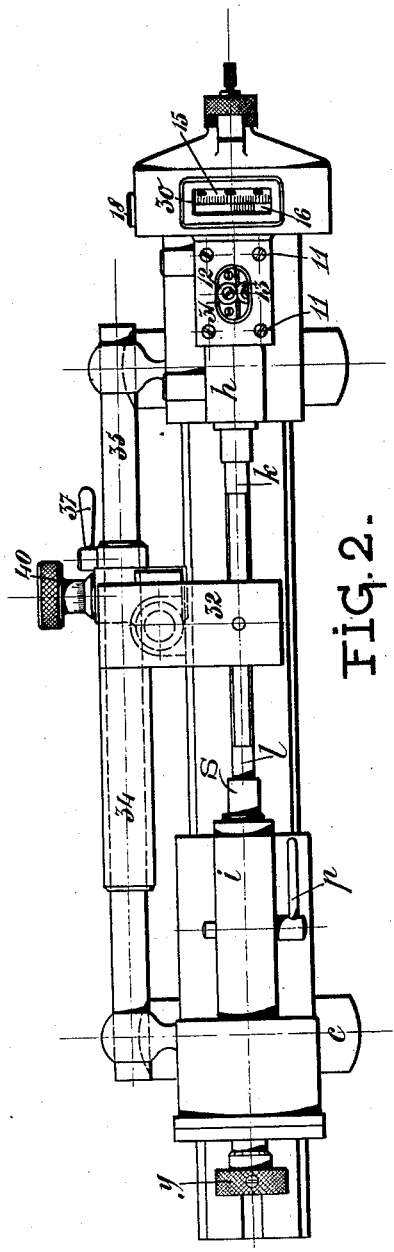

H. COULLERY.
MEASURING INSTRUMENT.
APPLICATION FILED AUG. 17, 1909.
1,053,281.
Patented Feb. 18, 1913.
3 SHEETS—SHEET 3.
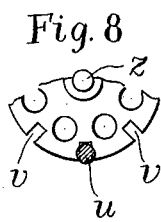
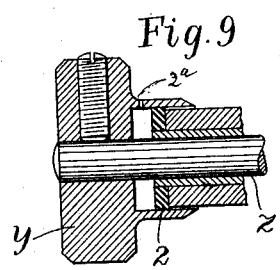
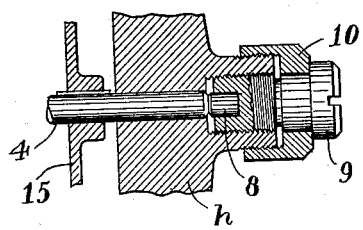
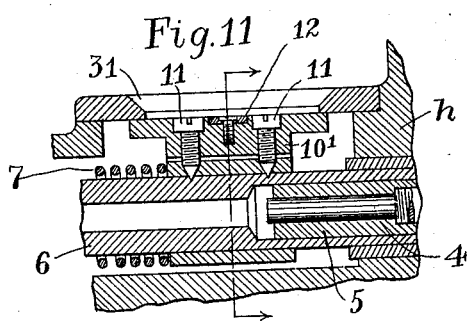
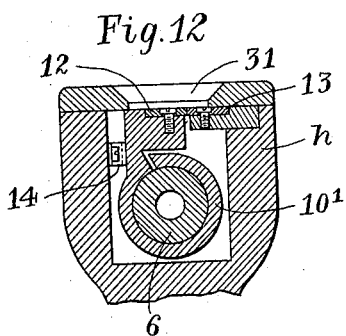
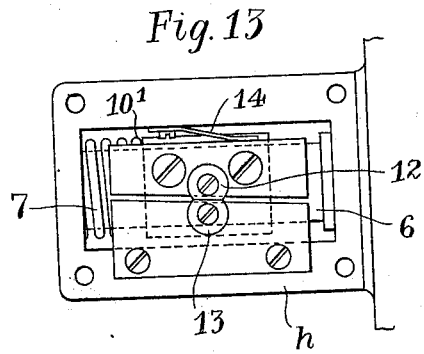
WITNESSES:
David J. Walsh
John H. Hoving.
INVENTOR,
Henri Coullery,
BY
ATTORNEY

UNITED STATES PATENT OFFICE.

HENRI COULLERY, OF LA CHAUX DE FONDS, SWITZERLAND.

MEASURING INSTRUMENT.

1,053,281.  Specification of Letters Patent.  Patented Feb. 18, 1913.

Application filed August 17, 1909. Serial No. 513,256.

*To all whom it may concern:*

Be it known that I, HENRI COULLERY, a citizen of the Swiss Republic, and resident of La Chaux de Fonds, Switzerland, have invented a certain new and useful Improvement in Measuring Instruments, of which the following is a specification.

In measuring instruments of the Whitworth type exactitude of the mensuration is sought to be attained by limiting the path of the micrometer screw and by maintaining constant the pressure that can be exerted by the headstocks relatively to each other. The means heretofore employed for attaining this result present the defect that, in using the instrument on the one hand a large number of loose calibers which are costly and troublesome in use, are necessary, while on the other hand the measurement cannot be taken so speedily and conveniently as to render the instruments of practical use in workshops. These defects are obviated in the instrument forming the object of the present invention.

The purpose of the invention is to accurately adjust the movable headstock in relation to the fixed headstock.

The novelty of this instrument consists in a combination of three members, by the coöperation of which the use of the instruments is rendered speedy and convenient, while their construction is also novel *per se;* these members are a headstock with a number of caliber pins which can be rendered operative at will, a headstock with yieldable means for limiting the pressure upon the caliber pins loose calibers and the object measured and the loose calibers for insertion between the headstocks, and provided with means for facilitating their application.

The instrument illustrated in the accompanying drawing can of course furnish the results of the mensuration in values of any desired system of mensuration.

Figure 1 shows it in front elevation, partly in section. Fig. 2 is a plan view. Fig. 3 is a view showing a transverse section near the middle of the bed and a transverse section partly through the stationary headstock. Fig. 4 is a section on Fig. 1, showing the vernier mechanism on the stationary headstock. Fig. 5 is a section through the right hand leg of Fig. 1. Fig. 6 is an enlarged section of the knob and mechanism for operating the micrometer 4 in the stationary head stock. Fig. 7 is a cross-section through Fig. 6. Fig. 8 is a detail view of the locking device for the caliber pins located in the movable headstock. Fig. 9 is an enlarged view of the dash-pot. Fig. 10 is an enlarged detail view of portions of the stationary headstock. Fig. 11 is a fragmental longitudinal section showing a part of the mounting of the micrometer screw in the stationary headstock. Fig. 12 is a section taken on the arrow-terminated dotted line of Fig. 11. Fig. 13 is a side elevation of the mounting shown in Figs. 11 and 12.

The bed of the machine is carried at $a$ and $b$ by feet, of which one $c$ is fixed directly to the bed, while the other foot is fixed to the bed by means of a screw $f$ and a washer $g$, Fig. 5 clamped between this screw and the foot and bearing against a conical lug $d$ provided on said foot. On the bed, which is provided with dovetail grooves, a stationary and a displaceable headstock $h$ and $i$ respectively are arranged and adapted to be fixed by means of cam studs $m$ $n$ and $o$. The stud $o$ of the movable headstock is actuated by a handle $p$ Fig. 2 which can readily be adjusted by the fingers of the hand which displaces the headstock. The headstocks $i$ and $h$ comprise bolts $l$ and $k$ the latter of which can be displaced from 1/10000th to 1 mm. and the former by an entire mm. by means of an adjusting device provided in the respective headstocks. By means of loose calibers belonging to the instrument the two headstocks can be relatively displaced so that every length can be determined by adjusting the bolt $l$ by a whole mm. and the bolt $k$ by fractions of a mm.

The adjusting means for the bolt $l$ consists of eleven caliber pins mounted in a revolver head $q$; the lengths of these pins each differ one from the other by one mm. By revolving the head $q$, these caliber pins are by manual rotation of the head $q$, brought as required between a stationary bolt $r$ and a piston $s$ guided in the headstock $i$. Contact between these members is insured by a helical spring $t$. The position of the caliber pin is maintained by the head $q$ which is clamped for the time being by a pin $u$ inserted in a recess $v$ Figs. 1 and 8 in a plate $x$ fixed to the revolver head $q$. The pin $u$ is supported in a bore in the end of the stock $i$. Eleven such recesses are provided corresponding to the number of the caliber pins. The caliber pins are exchanged one for the other without shock or friction in the following manner: By pressing a knob $y$ toward the right hand a shaft $z$ carrying the revolver head $q$ is displaced, the clamped caliber pin being freed from the stationary pin $r$. During its further displacement the shaft $z$ strikes against a lever $l'$ which from this moment, owing to the lever transmission, displaces the piston $s$ at twice the speed and lifts it from the caliber pin. As soon as this is entirely released the revolver head $q$ can be rotated, as the recess $v$ in the plate $x$ has simultaneously become disengaged from the pin $u$. A scale on the knob $y$ indicates by how many mm. the clamped caliber pin differs from the zero position, that is to say, the position corresponding to the longest caliber pin. If, after one of the caliber pins has been adjusted, the knob $y$ is released, it returns to its initial position under the influence of the spring $t$. An excessively quick return movement and the shocks which would result therefrom are prevented by dash-pot or air checking mechanism consisting of a plate 2 of leather or rubber; Fig. 9 which acts as a piston in the cylinder formed by boring the knob $y$, an air-vent being provided at $2^a$. The revolver head $q$ is protected from dust or other harmful influences in the interior of the headstock $i$. By means of this device, the bolt $l$ may be given ten adjustments each differing from the other by 1 mm., so that after the two bolts $k$ and $l$ brought into the zero position have been displaced and the headstock $i$ then fixed, distances from 0 to 10 mm. can be measured.

For the purpose of measuring lengths exceeding 10 mm., the headstock $i$ is displaced by means of a cm. scale upon the bed, for approximately the length and then adjusted to the exact amount by means of loose calibers such as are also employed in other measuring instruments, but in the present instrument the number of loose calibers required for a given effective length of the micrometer screw is twenty times smaller than when such calibers are used exclusively. Since the revolving head $q$ is provided with eleven pins, and the longest is longer than the shortest by 10 mm. and either the longest or shortest can be used, therefore each loose caliber $j$, $j'$ (Fig. 1) may be used for two adjustments of the headstock and consequently for twenty adjustments of the bolts. Thus, for example, a caliber $j$ 20 mm. long permits of adjusting the headstock for this distance when the revolver head is first of all set at zero, but an interval of 10 mm. between the headstocks can be adjusted also when the revolver head is set at 10 mm. With an effective length of the micrometer screw of 1 mm. the loose calibers need only amount to 20 mm. and a multiple thereof. Another result of this construction of the instrument is to facilitate the reading of the value because the number of cm. is found on the scale on the bed, and the number of mm. on the scale on the knob $y$. The fractions of mm. are adjusted by means of the headstock $h$ which likewise comprises means which insure a constantly uniform pressure of the bolts toward each other. A micrometer screw 4 Figs. 1 and 11 is guided in a nut 5 fixed inside a piston 6 carrying the bolt $k$. A spring 7 presses the nut 5 constantly against the micrometer screw 4, the other end of which bears against a pin 8 Fig. 10 which is adjusted by a screw 9 and is secured in position by a nut 10. Any play between these members resulting from wear or defective adjustment is thus prevented. The piston 6 is mounted in a guide $10^1$ (Figs. 3 and 11) fixed by screws 11 to the piston and carries a plate 12 which bears against a fixed plate 13 Figs. 12 and 13 under the influence of a spring 14. As the contact surfaces of the two plates are slightly inclined one to the other, the piston 6 and the nut 5 effect a helical movement by means of which faults in the micrometer screw can be very exactly compensated if necessary. A mark on the plates 12 and 13 enables the piston to be returned to its initial position before each measurement so that the same threads on the micrometer screw and its nuts are always utilized. A plate 15 on the gear wheel 20 fixed to the spindle of the micrometer screw is divided into a scale of 500 units. As the pitch of the screw is half a mm., each unit corresponds to a displacement of the bolt $k$ of 1/1000 of a mm. A nonius (or vernier) 16 arranged on a segment of a lever 17, Figs. 1, 2 and 4 enables 1/10000 of a mm. to be read. An adjusting screw 18 (Fig. 4) and a counter spring 19 mounted opposite to it which embrace a second arm of the lever 17 between them, enables the nonius to be set at zero at the begining of the measurement.

The micrometer 4 is operated by means of an internal toothed wheel 20 a pinion 21, a spiral spring 22, Fig. 6 and a knob 23. This knob is screwed upon a sleeve 24, which is rotatable upon a stationary socket 25. One end of the spiral spring 22 is connected with the sleeve 24, and the other with a tappet 26. The tappet is fixed to the shaft of the pinion by means of a screw 27 and presents a projection 28 (Fig. 7) which is pressed by the action of the spiral spring 22 against a stop 29 formed on the adjoining end of the sleeve 24. When the knob 23 is rotated, the tappet 26 remains in contact with the stop 29 until the bolts bear against the object to be measured. The tappet then separates from the stop and the spiral spring consequently acts directly upon the pinion. The forces acting upon the pinion, the micrometer screw and the bolts are therefore constant and determined by the magnitude of the tension imparted to the spring 22. With the transmission of the gear wheel 20 and the pinion 21, the speed imparted to the plate 15 and the micrometer screw is relatively much less than the speed imparted to the knob 23. By this means the shocks arising from the displacement of the masses are diminished, and the pressure of the bolts one toward the other rendered as uniform as possible. The entire device is arranged inside the headstock $h$ and the reading is taken through the glass plate 30 so that the parts are protected from dust, blows or sudden alterations of temperature.

The part to be measured can be held in the hand, but it is preferable to arrange it upon a measuring table 32. This measuring table rests on a upright shaft guided in a sleeve 34 (Fig. 3) which sleeve is displaceable upon a spindle 35 fixed on the bed and is pressed against this spindle by a spring 36 (Fig. 1). The sleeve is fixed by means of a handle 37. The table is adjustable in height by means of any suitable means actuated by a knob 40. A scale on the knob 40 Fig. 2, indicates the distance between the table and the axis of the bolts.

The present instrument comprises six loose calibers $j$, $j'$ of novel construction and 20, 40, 60, 80, 100 and 200 mm. in length. The first four calibers $j$ end in head pieces 43 with a semi cylindrical projection 44 by means of which they are mounted on the bolts $k$ and $l$ in such a manner that they can be exactly adjusted and very speedily mounted and removed. By means of a handle 45 they can be seized without their being heated by direct contact. In the operative position of the calibers this handle forms a counterweight which prevents them from rotating and falling out. The 100 and 200 mm. pins are provided only with a cap by means of which they can be united to the bolts $l$ or $k$ when the bolts are to be adjusted by more than 100 mm. For example, an interval of 240 mm. is obtained, as shown in Fig. 1, by combining a caliber of 200 mm. with a caliber of 40 mm. In this case the former is supported by a support 46 resting on the bed which is indicated in broken lines.

It should be noted that the construction of each of the two headstocks, of the loose calibers and of the measuring table is novel *per se* and also that their combination gives an instrument with a novel action. These parts can also be used separately with advantage on measuring instruments of another kind.

Having described my invention I declare that what I claim and desire to secure by Letters Patent of the United States is:—

1. In a measuring instrument, the combination of a stationary headstock; a movable headstock; a stationary bolt and a piston in said movable headstock; a plurality of caliber-pins in said movable headstock, any one of which is adapted to be placed between said stationary bolt and said piston; yieldable means for pressing the piston against the caliber pin; and loose calibers between said stationary headstock and piston.

2. In a measuring instrument, the combination of a stationary headstock; a movable headstock; a stationary bolt and a piston in said movable headstock; a plurality of caliber-pins in said movable headstock, any one of which is adapted to be placed between said stationary bolt and said piston; yieldable means for pressing the piston against the caliber pin; and loose calibers between said stationary headstock and piston, said loose calibers being provided with curved heads adapted to engage around the ends of the respective adjacent loose calibers.

3. In a measuring instrument, a movable headstock, a rotary head rotatably mounted therein; a fixed bolt and a piston therein; a series of caliber pins in said rotary head and adapted to be moved one at a time thereby between said bolt and piston; a spring for causing the piston to press each pin in contact with the fixed bolt; a stationary headstock a slidable piston therein; bolts fixed in said pistons; loose calibers inserted between said last named bolts and provided with ends adapted to engage the adjacent bolts or calibers; and means in the stationary head for causing the bolt thereof to press toward the object to be measured.

4. In a measuring instrument, a movable headstock; a rotatable head therein provided with a series of bores; a fixed bolt and a sliding piston in said headstock; a series of caliber pins in said bores and adapted to be placed one at a time between said fixed bolt and piston; and a spring for assuring contact between piston and caliber pins, and between the caliber pins and the fixed bolt.

5. In a measuring instrument, the combination of a stationary headstock; a movable headstock; a rotatable head in the movable headstock and provided with a series of bores; a piston and a fixed bolt in the movable headstock; a series of caliber pins in said bores and adapted to be placed one at a time between said fixed bolt and piston; a piston in said stationary headstock; movable bolt in each piston; loose calibers placed end for end between said movable bolts and provided with counterweights for preventing the loose calibers from rotating; and means for holding said loose calibers end to end with each other and said movable bolts.

In testimony whereof I have signed my name to this specification in the presence of two subscribing witnesses.

HENRI COULLERY.

Witnesses:
ERNST LUTTER,
DORA H. GETENS.

Copies of this patent may be obtained for five cents each, by addressing the "Commissioner of Patents, Washington, D. C."